(12) United States Patent
Kratz et al.

(10) Patent No.: US 9,272,464 B2
(45) Date of Patent: Mar. 1, 2016

(54) ARTICLE MADE OF A SHAPE-MEMORY COMPOSITE MATERIAL, METHOD FOR THE PRODUCTION THEREOF, AND METHOD FOR RETRIEVING STORED SHAPES

(75) Inventors: Karl Kratz, Berlin (DE); Andreas Lendlein, Berlin (DE); Reinhard Mohr, Berlin (DE); Marc Behl, Berlin (DE)

(73) Assignee: Helmholtz-Zentrum Geesthacht Zentrum Fuer Material-Und Kuestenforschung GMBH, Geesthacht (DE)

( * ) Notice: Subject to any disclaimer, the term of this patent is extended or adjusted under 35 U.S.C. 154(b) by 1019 days.

(21) Appl. No.: 12/808,876

(22) PCT Filed: Dec. 16, 2008

(86) PCT No.: PCT/EP2008/067582
§ 371 (c)(1),
(2), (4) Date: Jul. 22, 2010

(87) PCT Pub. No.: WO2009/077515
PCT Pub. Date: Jun. 25, 2009

(65) Prior Publication Data
US 2011/0008596 A1    Jan. 13, 2011

(30) Foreign Application Priority Data
Dec. 17, 2007    (DE) .......................... 10 2007 061 342

(51) Int. Cl.
*B32B 7/02* (2006.01)
*B29C 67/24* (2006.01)
(Continued)

(52) U.S. Cl.
CPC ............. *B29C 61/0608* (2013.01); *B29C 61/00* (2013.01); *B29C 2035/0811* (2013.01); *B29C 2791/001* (2013.01); *B29K 2105/16* (2013.01); *Y10T 428/24942* (2015.01)

(58) Field of Classification Search
USPC .................... 428/212; 264/296, 299; 219/600
See application file for complete search history.

(56) References Cited

U.S. PATENT DOCUMENTS

| 5,151,152 | A | 9/1992 | Kaeufe et al. |
| 2003/0033007 | A1 | 2/2003 | Sirhan et al. |
| 2003/0050687 | A1* | 3/2003 | Schwade et al. ............. 623/1.15 |

(Continued)

FOREIGN PATENT DOCUMENTS

| DE | 38 26 428 A1 | 2/1990 |
| DE | 38 26 429 A1 | 2/1990 |

(Continued)

OTHER PUBLICATIONS

Mohr; Initiation of Shape-Memory Effect by Inductive Heating of Magnetic Nanoparticles in Thermoplastic Polymers; Mar. 7, 2006; PNAS; vol. 103 n. 10; whole document.*

(Continued)

*Primary Examiner* — Tahseen N Khan
(74) *Attorney, Agent, or Firm* — VLP Law Group LLP; Kent H. Cheng

(57) ABSTRACT

The invention relates to an article (10) made of a shape memory composite material (12) comprising a shape memory polymer (14) and a magnetic material (16) embedded therein, said shape memory polymer (14) after thermomechanical programming being capable of undergoing at least one temperature-induced transition from a temporary shape into a permanent shape, as well as to a method for the production thereof and a method for retrieving stored shapes.

It is envisaged that the article (10) has at least two directly or indirectly interconnected sections (18, 20) which differ by a different surface-to-volume ratio (S/V).

18 Claims, 6 Drawing Sheets

(51) Int. Cl.
   *H05B 6/02* (2006.01)
   *B29C 61/06* (2006.01)
   *B29C 61/00* (2006.01)
   *B29C 35/08* (2006.01)
   *B29K 105/16* (2006.01)

(56) References Cited

U.S. PATENT DOCUMENTS

2004/0033336 A1 2/2004 Schulte
2005/0212630 A1 9/2005 Buckley et al.

FOREIGN PATENT DOCUMENTS

| EP | 1 634 692 A1 | 3/2006 |
|---|---|---|
| EP | 1 859 819 A2 | 11/2007 |
| EP | 1859819 A2 * | 11/2007 |
| WO | 99/42528 A2 | 8/1999 |
| WO | 02/45536 A2 | 6/2002 |
| WO | 03/009779 A2 | 2/2003 |
| WO | 2005/042142 A2 | 5/2005 |

OTHER PUBLICATIONS

Bellin I, et al., "Polymetric triple-shape materials", Proc. Nat. Acad. Sci. USA, 2006 103(48): 18043-18047.

Mohr R., et al., "Initiation of shape-memory effect by inductive heating of magnetic nanoparticles in thermoplastic polymers", Proc. Nat. Acad. Sci. USA, 2006, 103(10): 3540-3545.

* cited by examiner

ARTICLE MADE OF A SHAPE-MEMORY COMPOSITE MATERIAL, METHOD FOR THE PRODUCTION THEREOF, AND METHOD FOR RETRIEVING STORED SHAPES

This is a national stage entry of International Application PCT/EP2008/067582, with an international filing date of Dec. 16, 2008, which was published under PCT Article 21(2) in German, which claims priority from German Application No. 10 2007 061 342.5, which was filed on Dec. 17, 2007, the entire disclosures of which are incorporated into this application by reference.

The invention relates to an article made of a shape memory composite material comprising a shape memory polymer and a magnetic material embedded therein, said shape memory polymer after thermomechanical programming being capable of undergoing a temperature-induced transition from a temporary shape into its permanent shape. The invention also relates to a thermomechanical method for the production of said programmed article and to a method for retrieving the stored shapes of an article programmed in this way.

So-called shape memory polymers (SMPs), which undergo a transition in shape from a temporary shape into a permanent shape in accordance with a previous programming upon induction by a suitable stimulus, are known in the prior art. This shape memory effect is most often stimulated thermally, that is, the restoring effect driven by entropic elasticity takes place when heating the polymer material above the defined switching temperature. As a rule, shape memory polymers are polymer networks wherein chemical (covalent) or physical (non-covalent) crosslinking sites determine the permanent shape. Programming takes place by deforming the polymer material above the transition temperature of a phase formed by a switching segment (=switching phase) and subsequently cooling the polymer material below this temperature, while maintaining the deformation forces so as to fix the temporary shape. Renewed heating above the switching temperature gives rise to a phase transition and restoration of the original permanent shape. (In contrast to the transition temperature, $T_{trans}$, the switching temperature, $T_{SW}$, depends on the mechanical motion defining the macroscopic change in shape so that the two temperatures may slightly differ from each other.)

Apart from the above dual-shape polymers, which may assume a temporary shape in addition to their permanent shape, AB polymer networks (so-called triple-shape polymers) have meanwhile been described, which have two phases formed of different switching segments, said two phases having different transition and switching temperatures and are thus able to store two temporary shapes in addition to their permanent shape in their "shape memory" (e.g. Bellin et al., Proc. Nat. Acad. Sci. USA, 2006 103(48): 18043-18047; or WO 99/42528 A). These triple-shape plastic materials have basically at least two non-miscible, segregated phases so that each phase can be used for fixing one temporary shape at a time. The permanent shape is established by covalent crosslinking sites in the polymer network, while the two temporary shapes are defined by a thermomechanical programming process. The ability to perform two consecutive shape transitions by way of thermal induction, namely, from a first temporary shape into a second temporary shape and from there into the permanent shape, allows complex movements and offers a variety of potential applications, for instance in medicine.

Magnetically stimulated induction of shape transition is also well-known, wherein shape memory composite materials are used which comprise a matrix of a shape memory polymer and magnetic particles embedded therein. The shape memory polymer is a thermally stimulable SMP which, following thermomechanical programming, has the ability to undergo a thermally induced shape transition. Exposure to an alternating magnetic field causes inductive heating of the magnetic particles and, as a consequence, of the surrounding SMP so that the latter reaches its switching temperature and the transition from the previously programmed temporary shape into the permanent shape is induced.

For example, Mohr et al. (Proc. Nat. Acad. Sci. USA, 2006, 103(10): 3540-3545) have described corresponding composite materials made of shape memory polymers with embedded magnetic nanoparticles. What is described therein is the relationship between the surface-to-volume ratio (S/V) and the maximum achievable temperature of a material, $T_{max}$, at a given magnetic field, and in particular the finding that the maximum temperature $T_{max}$ decreases with increasing S/V.

WO 2005/042142 A2 describes shape memory composite materials comprising a shape memory polymer matrix and magnetic and/or metallic colloids embedded therein. Triggered by an external magnetic field, the colloidal particles and thus the surrounding polymer material undergo inductive heating, thereby inducing a physical change in structure, in particular a relaxation process, which gives rise to a change of the geometrical shape and ultimately results in liberation of a pharmacological agent. A shape memory composite comprising a shape memory polymer matrix and magnetic particles embedded therein is also known from US 2005/0212630 A1. Similarly, this system is able to perform magnetically induced shape transitions.

The thus offered option of controlling the thermally induced shape memory effect by alternating magnetic fields is of particular interest for medical uses where conventional external supply of heat is often intolerable in physiological terms. However, many uses require complex changes in shape, especially those comprising a sequential succession of a plurality of shapes. At present, this cannot be done when relying on the principle of magnetic stimulation.

The present invention is therefore based on the object of providing an article exhibiting a magnetically stimulable shape memory effect, which is capable of performing more than one magnetically induced shape transitions. In addition, said article should be producible as easily as possible from a uniform material.

Said object is accomplished by means of an article having the features of claim 1. The article according to the invention is made of a shape memory composite material comprising a shape memory polymer and at least one magnetic material embedded therein. The shape memory polymer is a "conventional" SMP having a thermally stimulable shape memory effect, i.e., it is able to perform at least one shape transition, induced by temperature, from a thermomechanically programmed temporary shape into a permanent shape. As for the magnetic material, the only important issue is its ability to interact in an alternating magnetic field in such a way that heating takes place. Thus, the magnetic material can be heated by induction via an alternating magnetic field, so that heating of the polymer material above its switching temperature can take place, thereby inducing shape recovery. The article is remarkable in that it exhibits at least two directly or indirectly interconnected sections differing from each other by a different surface/volume ratio, S/V. The invention, which in particular resides in the special geometric configuration of the article, makes use of the fact that geometric bodies consisting of shape memory composite materials having different S/V assume different material temperatures in a given alternating magnetic field (FIG. 9). More specifically, the maximum achievable material temperature of a geometric body becomes lower with increasing surface/volume ratio thereof. This can be attributed to the relatively higher heat transfer to the environment as compared to a body having a smaller S/V. According to the invention, a plurality of partial sections having different S/V are present in the article, making it possible to utilize the heat transport processes within the component, including interaction with the environment, in such a way that the section having the smallest S/V will reach the material temperature required for shape recovery (switching) in a suitable alternating magnetic field, while a section having a larger S/V does not. Only when further increasing the magnetic field strength and/or frequency, the partial section having the larger S/V will reach the material temperature required for shape recovery to perform the previously programmed shape transition. Without increasing the ambient temperature it is possible in this way to retrieve a number of shapes by successively intensifying the external magnetic field, the shape transitions of the individual partial sections being switched separately in a time-shifted manner. In contrast to the shape transition by increasing the ambient temperature, it is possible according to the invention to separately switch locally separated partial sections of the article, initially switching the section having the smallest S/V, followed by the other sections in the order of their S/V. Consequently, the number of programmable temporary shapes is ultimately determined solely by the number of sections having different surface/volume ratios.

One advantage of the invention resides in the fact that the article can be produced in the form of a single piece from a uniform composite material so that all sections having different S/V consist of the same material. Compared to a conceivable alternative, namely, implementing a series of successive shape transitions by means of different materials of partial sections, e.g. via different concentrations of the magnetic material or by means of different shape memory polymers having different switching temperatures, the inventive one-piece article of uniform material is easy to produce, for instance in a injection molding process or the like.

In the context of the present invention the term "section" (or partial section) is understood to be a visually distinguishable portion of the article, the boundaries of which being defined by the geometric situation in the body rather than exhibiting a random course. More specifically, the sections involve the remarkable feature that the transition from one S/V of a section to an S/V of another section at the boundary surface thereof is abrupt or—at least in relation to the overall expanse of the article—steep. In this context, "steep" is understood to be a transition between two adjacent surface/volume ratios extending over a length of at maximum 10% of the overall expanse of the article.

In a preferred embodiment of the invention the at least two sections of each article have a constant material thickness in at least one direction in space. Thus, given a flat design of the article, different surface/volume ratios can only be implemented by varying the material thickness of the sections. Alternatively, or in addition to the above measure, it is advantageous if each of the at least two sections has an S/V that is constant in at least one direction in space, especially along the longitudinal expanse. The presence of a constant surface/volume ratio within a section achieves locally uniform heat dissipation into the environment and thus homogeneous material temperature within the section when exposing the article to a specific magnetic field. Thus, cooperative shape recovery in the entire section is initiated when the material temperature exceeds the switching temperature of the shape memory polymer.

It is preferably envisaged that the surface/volume ratios of the different sections of the article differ by a factor of at least 1.2, particularly at least 1.5. Even more advantageous is a difference by a factor of at least 2. This ensures sufficiently large differences of the magnetic field strengths and/or frequencies required to switch the respective sections. For the same reason it is preferably envisaged that the at least two segments are selected in such a way that their surface/volume ratios correspond to a difference of the maximum material temperature achievable in a given magnetic field of at least 10 K, particularly at least 15 K, and even more advantageously at least 20 K.

As envisaged in another advantageous embodiment of the invention, the sections of the article are not directly connected to each other, but indirectly through an interposed thermally insulating section. For example, the latter may be characterized by a surface-to-volume ratio as high as possible, which is associated with a high heat dissipation rate into the environment, in which event the S/V of the thermally insulating section corresponds to at least the S/V of that section of the two which has the higher S/V and particularly exceeds this S/V by at least 10%, preferably at least 20%.

The relationship between thermally induced shape memory transition and surface-to-volume ratio S/V can be seen in FIGS. 10 and 11 wherein, on the one hand, the elongation is plotted versus the temperature (FIG. 10) and, on the other hand, the dependence of the maximum temperature $T_{max}$ achievable in a given magnetic field on the S/V for composite materials with nanoparticle contents of 1.5, 5.0, 7.5 and 10 wt. % is shown (FIG. 11). Accordingly, different material temperatures and thus initiation of the shape memory effect can be achieved by using different S/V. Furthermore, the advantages of a desirably high slope of the characteristic line in the $T_{max}$-versus-S/V diagram become apparent, because in this way the S/V difference at a given temperature interval is preferably low (see auxiliary lines in FIG. 11), or the adjustable temperature interval at a given S/V is as large as possible. A characteristic line with a higher slope can be achieved either by changing the particle material or by increasing the content of nanoparticles (FIG. 11).

It is also advantageous if the backward shape memory effect proceeds as abruptly as possible and in a relatively small temperature interval so that the required difference of the surface-to-volume ratio for separate activation of different component sections is as small as possible. FIG. 12 shows the variation of elongation as a function of temperature for a composite of a thermoplastic material with 10 wt. % particles and for a polymer network with 5 wt. % particles. Recovery is much more abrupt in the network. Separate activation of individual sections of a component therefore requires smaller S/V differences of the component.

Another aspect of the invention relates to a method for producing a programmed article, said method comprising the steps of:
a) providing an article in its permanent shape in accordance with the above-described invention;
b) deforming a first section of the article at a material temperature above the switching temperature of the shape memory composite material and subsequently cooling below the switching temperature; and
c) deforming a second section of the article at a material temperature above the switching temperature of the shape memory composite material and subsequently cooling below the switching temperature.

The above steps b) and c) can be performed in any order, consecutively or simultaneously. The material temperature required to this end can be achieved thermally or by interaction with an alternating magnetic field. For sequential implementation it is advantageous to start deforming and subsequent cooling with the partial section having higher S/V and subsequently apply this step to the section having a smaller S/V so as not to remove the programming of the first-treated section. Any order of the programming steps (b) and (c) is possible as long as separate heating of the sections having different S/V can be effected and such heating does not remove programming previously performed.

As an alternative to the above-described procedure, simultaneous or sequential deformation of the individual sections may also proceed below the switching temperature using "cold stretching" wherein the article is subjected to deformation below the transition temperature. The section to be programmed by cold stretching can be selected at will. Thus, both sections—and consequently both temporary shapes—of the article (TP1 and TP2) can be programmed by means of cold stretching. Alternatively, one section of the article can be programmed thermomechanically according to (a) or (b) (TP1) and the other section by cold stretching (TP2). Provided that the programming of a temporary form (TP1) programmed by cold stretching is not removed by partial heating, it is also possible to heat first and thereafter perform programming according to (a) and (b).

With materials whose switching transition is based on a glass transition, it is possible in another modification of the programming method to incorporate a suitable plasticizer in the polymer material below the switching temperature, e.g. at room temperature (e.g. by immersion in the plasticizer or a solution thereof), so that the switching temperature drops below ambient temperature and the sections undergo simultaneous or successive deformation at ambient temperature. The plasticizer is subsequently removed from the material, e.g. by extracting with a suitable solvent or applying a vacuum, thereby fixing the programmed temporary shapes. Similarly, a combination of different programming methods for the different sections of the article is possible, e.g. in such a way that one section is immersed in the plasticizer and programmed and another section is separately heated. Again, care must be taken that programming of one section does not remove the programming of another section.

Another aspect of the invention relates to a method for retrieving stored shapes of an article programmed according to the method described above, including the steps of:
(a) exposing the article to a first alternating magnetic field which is suitable to heat a first section of the article with a first surface-to-volume ratio $(S/V_1)$ to a temperature above the switching temperature of the shape memory composite material, said first section undergoing a shape transition and said article being transformed from a first temporary shape into a second temporary shape; and
(b) exposing the article to a second alternating magnetic field which is suitable to heat a second section of the article with a second surface-to-volume ratio $(S/V_2)$ greater than the first surface-to-volume ratio $(S/V_1)$ of the first section above the switching temperature of the shape memory composite material, said section undergoing a shape transition and said article being transformed from the second temporary shape into the permanent shape.

The transition from the first alternating magnetic field to the second alternating magnetic field may proceed by a step-by-step or continuous increase of the magnetic field strength and/or frequency.

In an alternative embodiment the magnetic field may also be interrupted (switched off) after step (a). The resulting temporary shape then remains stable until a second alternating magnetic field is applied in analogy to step (b).

Other preferred embodiments of the invention can be inferred from the other features specified in the subclaims.

The invention will be explained below in the examples with reference to the accompanying drawings wherein FIG. 1 shows an example of an inventive article according to a first advantageous embodiment;

Figure 2:
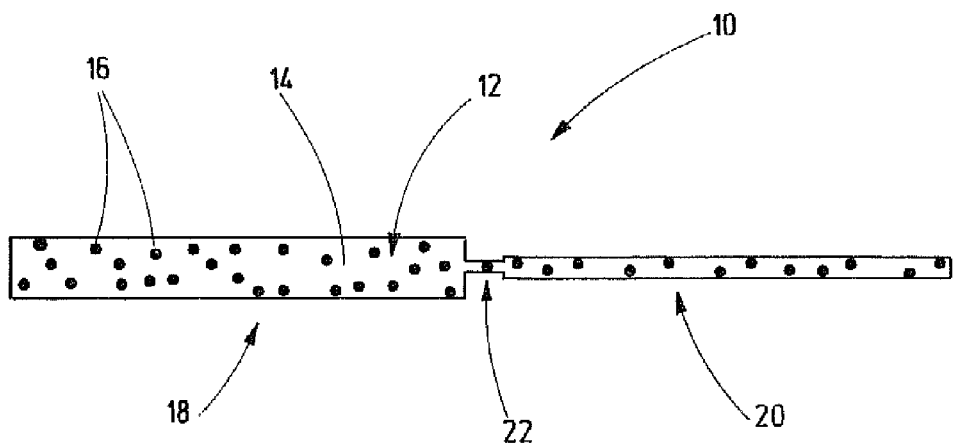
FIG. 2 shows an example of an inventive article according to a second advantageous embodiment.
Figure 5:
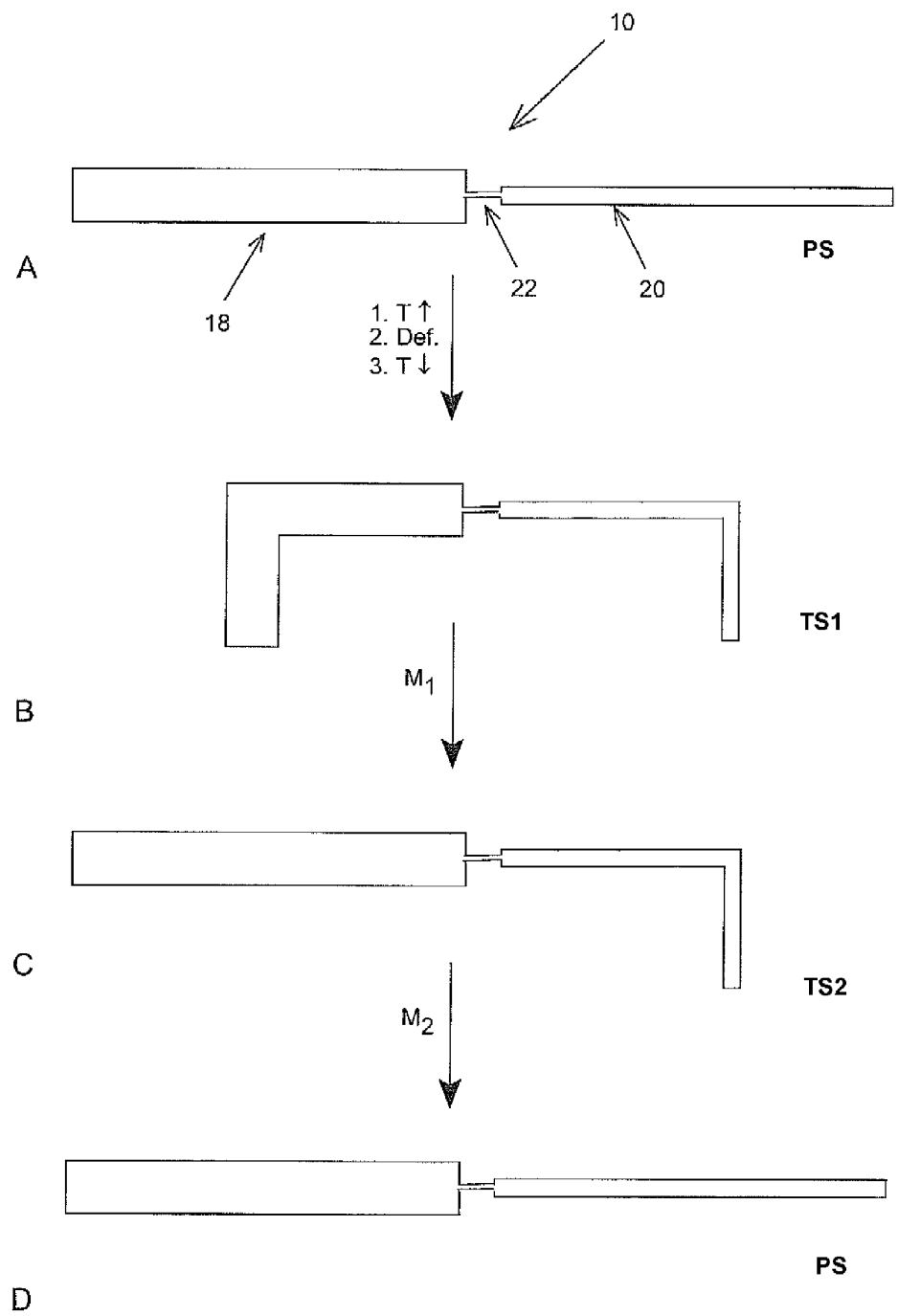
Figure 6:
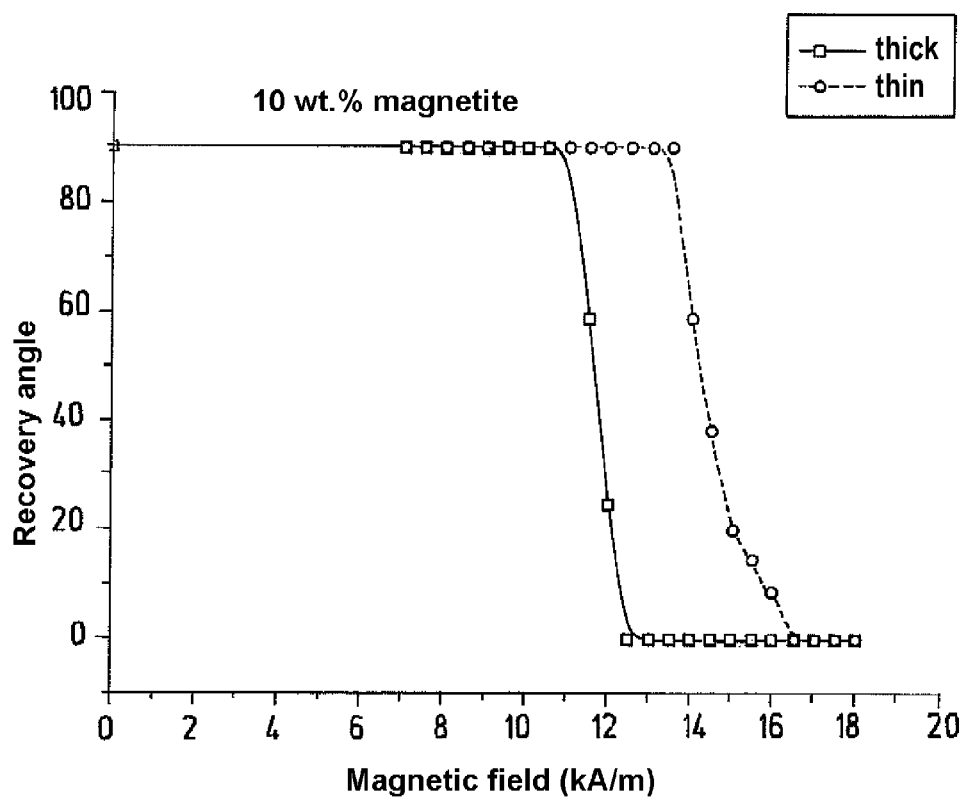
Figure 9:
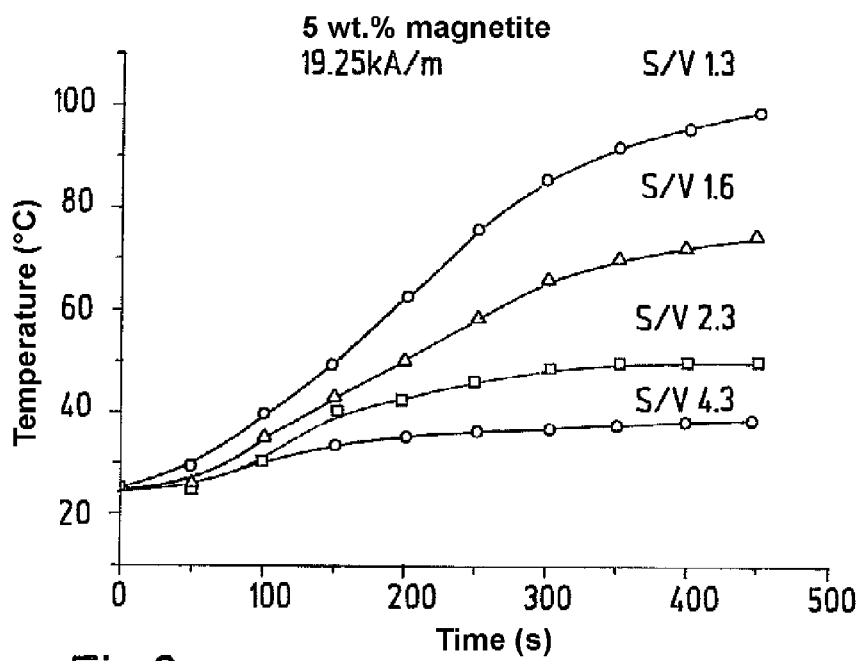
Figure 7:
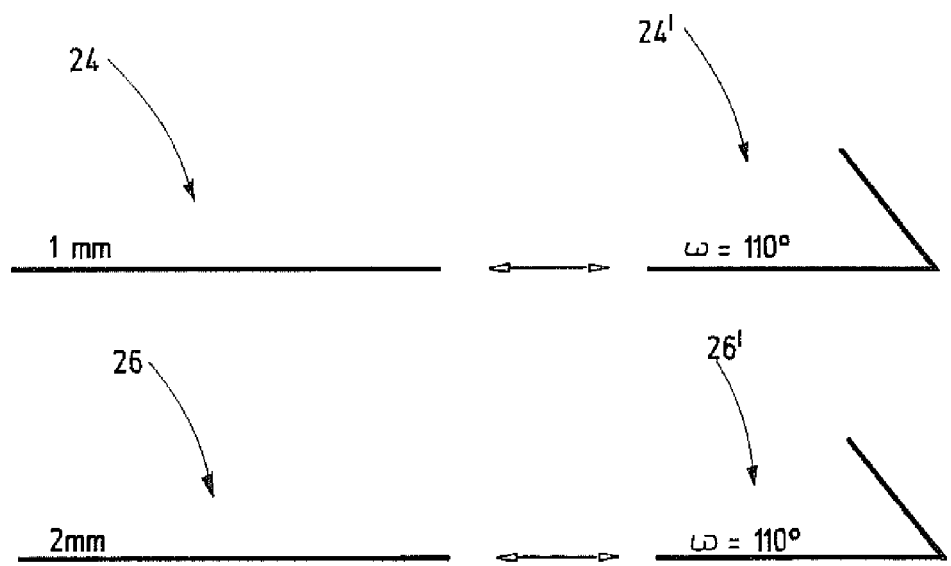
Figure 8:
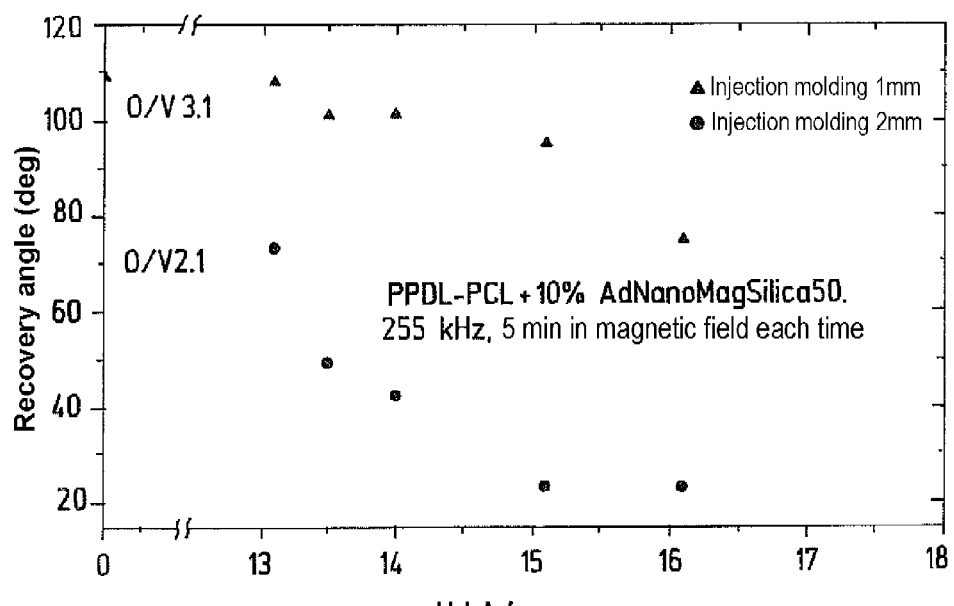
Figure 10:
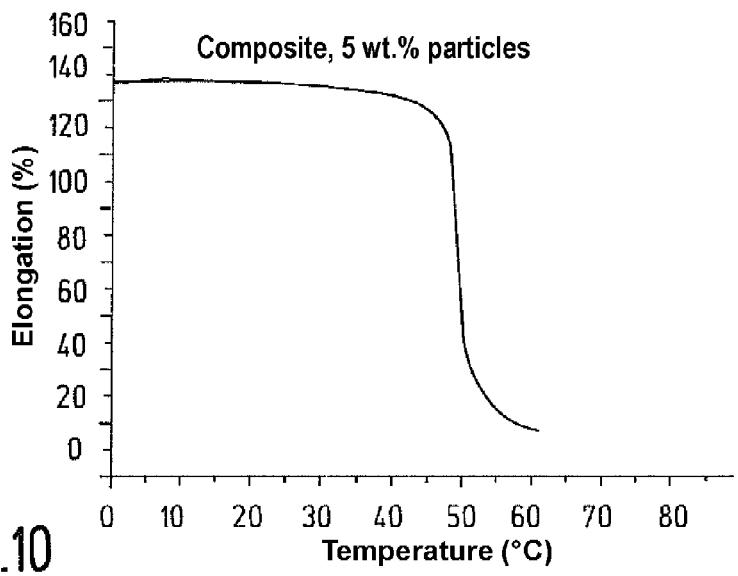
Figure 11:
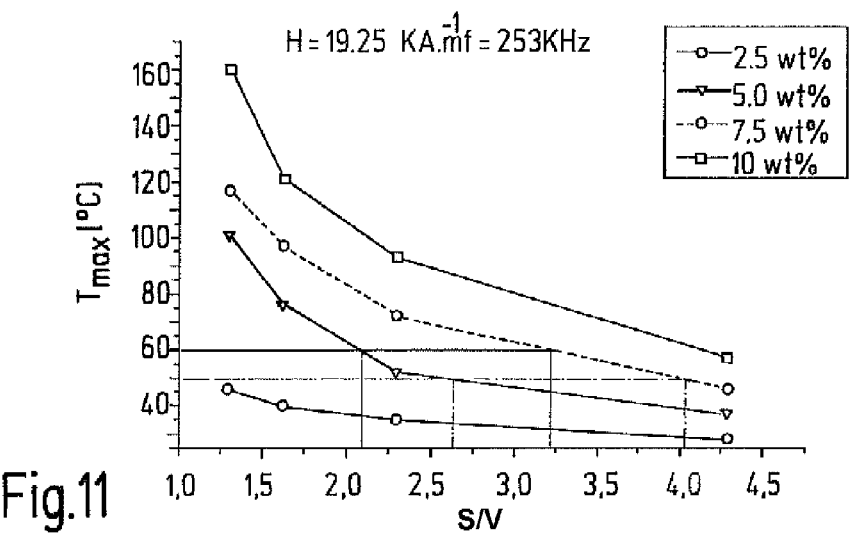
Figure 12:
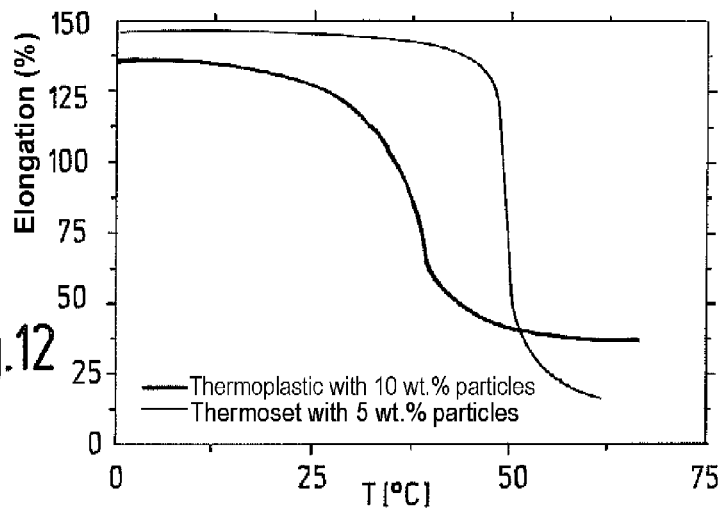

FIG. 5 A-D shows the stages of the programming process of an article in accordance with FIG. 2 and the retrieval of the magnetically stimulated shape transitions;

FIG. 6 shows the recovery angle of two sample sections with different S/V of an article in accordance with FIG. 2 as a function of the magnetic field strength;

FIG. 7 shows the experimental setup for investigating the magnetically stimulated shape memory effect in two test specimens with different S/V;

FIG. 8 shows the recovery results of the test specimens in accordance with FIG. 7 as a function of the magnetic field strength;

FIG. 9 shows the temporal course of the material temperature at a magnetic field strength of 19.25 kA/m for a composite material with 5 wt. % magnetic particles and different S/V (1.3, 1.6, 2.3 and 4.3);

FIG. 10 shows the dependence of the elongation on the material temperature of a composite material with 5 wt. % magnetic particles;

FIG. 11 shows the dependence of the maximum achievable material temperature $T_{max}$ on the S/V for a composite material with different contents of magnetic particles in a magnetic field of 19.25 kA/m; and FIG. 12 shows the change of elongation as a function of the material temperature of a composite material consisting of a thermoplastic shape memory polymer with 10 wt. % magnetic particles and of a polymer network with 10 wt. % magnetic particles.

Figure 1:
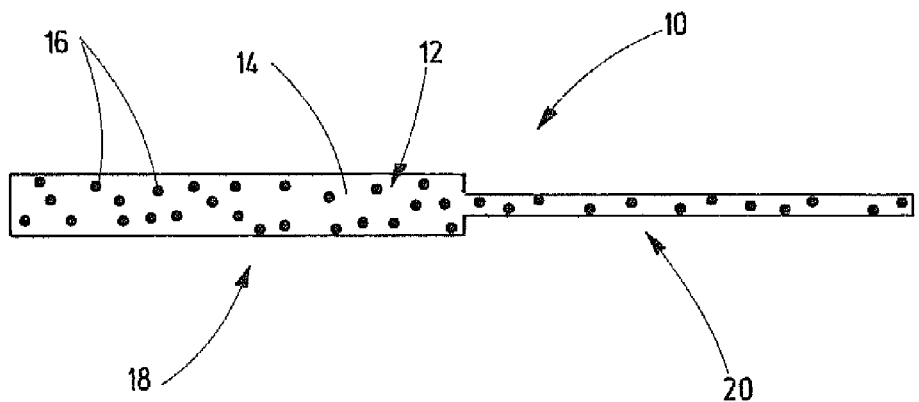

FIG. 1 shows an exemplary embodiment of an inventive article which, following suitable programming, can perform two magnetically induced shape transitions. The article, referred to as 10 as a whole, consists of a shape memory composite material 12 preferably produced as a single piece and comprising a shape memory polymer 14 and a magnetic material 16 embedded therein.

The shape memory polymer 14 is a polymer network with thermally inducible shape memory effect (SMP). Network formation may proceed via covalent bonds or physical interactions such as electrostatic effects. In addition to crosslinking sites, the polymer network comprises at least one type of a switching segment which has a material-dependent transition temperature, e.g. a crystallization temperature or a glass transition temperature. A wide variety of polymer networks with a shape memory effect have been described in the literature. In principle, the present invention is not limited to a specific material. For example, the polymer network may have a switching segment selected from the group of polyesters, particularly poly(ε-caprolactone); polyethers, polyurethanes, polyether urethanes, polyamides, polyimides, polyether imides, polyacrylates, polymethacrylates, polyvinyls, polystyrenes, polyoxymethylenes, poly(para-dioxanone), or others. It is also conceivable that the polymer network has two or more different switching segments from the above group, or others. The at least one switching segment is preferably selected in such a way that the switching temperature thereof is in a range that is acceptable for a given application.

The shape memory polymer may optionally have hydrolytically cleavable groups, particularly ester, amide, anhydride, carbonate, ether, orthoester groups or combinations thereof. As a result, biodegradable materials are obtained, and this may be advantageous particularly for applications in the field of biomedicine. Biodegradable shape memory polymers are also sufficiently known from the literature. The present invention is not limited to specific members of this group.

Referring to the magnetic material 16, it is preferably envisaged that this material is in the form of particles, particularly in the form of microparticles or nanoparticles. In this context, microparticles are defined by a mean particle diameter in the range of from 1 to 999 μm and nanoparticles by a mean particle diameter in the range of from 1 to 999 nm. Consequently, this definition also includes a powdery consistency of the magnetic material 16. In material terms, all those materials are possible as magnetic material 16 which are capable of interacting in an alternating magnetic field in such a way that heating of the particles takes place. More specifically, the magnetic material may comprise metals such as Ni, Fe and/or Co. Also suitable are alloys, especially Ni—Si, Fe—Pt, Ni—Pd and/or Co—Pd. Furthermore, metal oxides can be used as magnetic material 16, particularly Ni—Zn—Fe—O, Ba—Co—Fe—O and/or Fe—O. In addition, magnetite or iron oxides can be used wherein the iron atoms are replaced at least partially with Co, Ni, Mn, Zn, Mg, Cu, Cr, Cd and/or Ga. Ferrites are also suitable, especially Ni—Zn ferrites and/or Sr ferrites. Mixtures of the above-mentioned materials are also possible. In a preferred fashion, materials are employed which undergo homogeneous distribution in the polymer matrix, i.e. result in a mixture as homogeneous as possible. Especially in those cases where such a behavior is absent, it can be envisaged to provide the particles of magnetic material 16 with a coating that improves the miscibility with the shape memory polymer. In particular, organic polymers are possible as coating material.

According to the invention, the article 10 has at least two sections; in the example as illustrated it has a section 18 with a relatively low S/V and a section 20 with a relatively high S/V. Given a cylindrical geometry in total, this is achieved by means of different diameters of the two sections 18 and 20, or, in the event of a planar geometry, by means of different thicknesses of the material. The article 10 illustrated in FIG. 1 has an abrupt transition between the two surface-to-volume ratios of the sections 18 and 20, which also defines the visually perceptible boundary surface between the two sections 18 and 20. Alternatively, a gradual course between the surface-to-volume ratios can be envisaged, but is selected with such a steepness that the length of the transition region is at maximum 10% of the total length of article 10. It is also conceivable that the article 10 has more than two sections with different S/V so that more than two transitions can be programmed and triggered.

In a preferred embodiment of the article 10 according to the invention the design of the latter is such that heat conduction between two adjacent sections is reduced or even stopped. A relevant example of such an embodiment is shown in FIG. 2. Therein, identical elements are denoted with identical reference numbers. In the example as illustrated, thermal conduction is made impossible in that the two sections 20 and 18 are not directly connected to each other, but indirectly through an interposed thermally insulating section 22. The latter is preferably made of the same composite material 12 as the rest of article 10 so that a one-piece type of production is possible. For suppression of heat conduction, the insulating section 22 has both small contact surfaces to the adjacent sections 18 and 20 and a surface-to-volume ratio as high as possible. In particular, the S/V of the insulating section 22 corresponds to at least that of the section with higher S/V or preferably exceeds the latter. In the illustrated example this is section 20, the S/V of the insulating section 22 being higher as a result of the smaller material thickness thereof.

According to an alternative option of suppressing the heat conduction between the sections 18, 20, which is not shown herein, an insulating section made of a material having very low heat conductivity is arranged between the sections 18, 20. However, this option is associated with significantly higher expenses in production so that the former embodiment in accordance with FIG. 2 is preferred.

Figure 3:
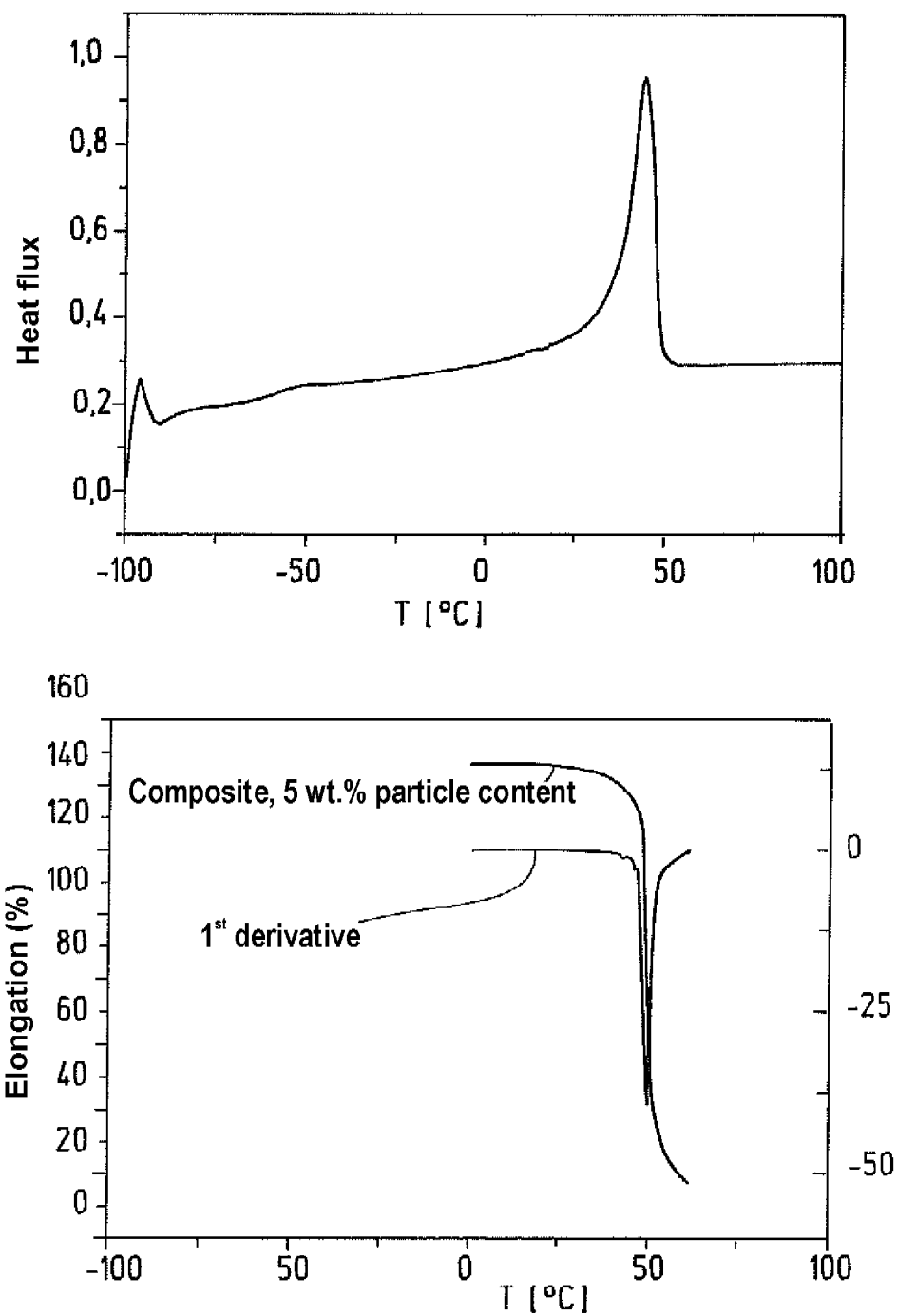
FIG. 3 shows the changes in (a) thermal and (b) mechanical-physical properties of an SMP composite network with 5 wt. % magnetic nanoparticles as a function of temperature.

To achieve the desired multiple shape effect, the shape memory properties of the polymer matrix 14 must be combined with the thermal properties of the composite 12 as a whole. As for the shape memory polymer 14, it is advantageous if this polymer has a switching region as narrow as possible, i.e. wide variation of the mechanical behavior (recovery) within a relatively small temperature interval. This is exemplified for a polymer network made of poly(ε-caprolactone) dimethacrylate in FIG. 3 wherein the lower diagram illustrates the percent change of the elongation ε and the first derivative thereof versus the temperature. The upper part shows a differential scanning calorimetry (DSC) diagram. It shows the melting point of the semicrystalline poly(ε-caprolactone) at about 52° C. However, a glass transition $T_g$ is also conceivable for systems having the herein described S/V dependence upon magnetic actuation. It is important that the systems—in accordance with a high value of the first derivative of the elongation—exhibit a change in their mechanical behavior as abrupt as possible. A narrow melting range or glass transition range is indicative of such systems, but not necessarily required. Inter alia, the thermal properties of the composite 12 are determined by the type of magnetic material 16 used. The thermal properties of the composite 12 are preferably selected in such a way that it exhibits a change as great as possible of the maximum achievable material temperature $T_{max}$ in dependence on the surface/volume ratio. Apart from the thermal conductivity of the shape memory composite material 12 and the heating rate of the magnetic material 16 in an alternating magnetic field, the heat transfer to the surrounding medium is a crucial issue.

Figure 4:
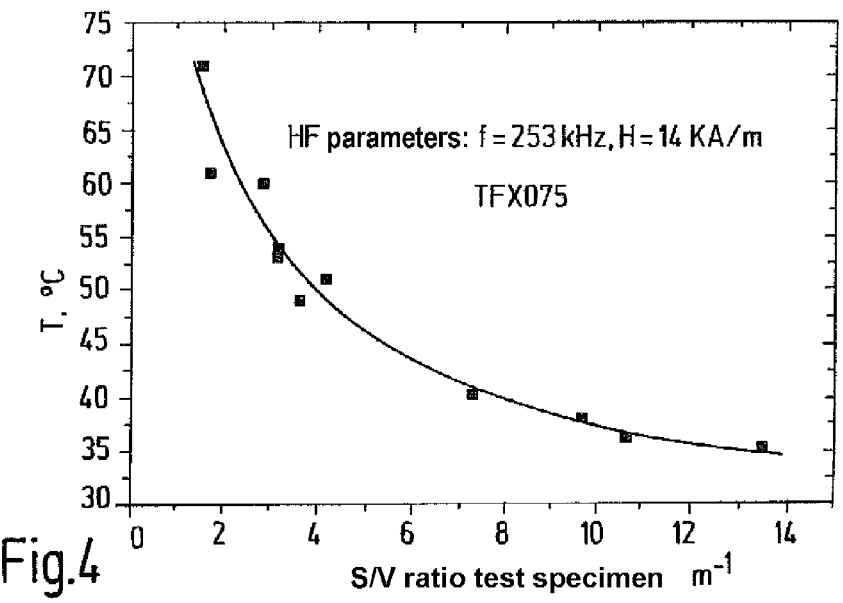
FIG. 4 shows the experimentally determined relationship of the maximum achievable material temperature $T_{max}$ of a test specimen in an alternating magnetic field as a function of its surface-to-volume ratio.

The dependence of the maximum achievable material temperature $T_{max}$ of a test specimen in a magnetic field on the surface/volume ratio thereof was investigated on an example material. Material samples were produced from a shape memory composite material consisting of a TPU polyether (Tecoflex® EC 72 from Noveon Inc.) as shape memory polymer and iron(II) oxide nanoparticles in an $SiO_2$ matrix (AdNano® MagSilica 50, Degussa AG) as magnetic material. The test specimens had a cylindrical geometry and differed in their diameter and height and thus in their surface-to-volume ratio. The test specimens were exposed to a magnetic field with a field strength of 14 kA/m and a frequency of 253 kHz in still air, and the temperature of the test specimens was measured after equilibrium conditions had established. The result is shown in FIG. 4 wherein the maximum achievable material temperature $T_{max}$ is plotted versus S/V. As expected, it can be seen that $T_{max}$ drops with increasing ratio of surface to volume. For example, a test specimen with an S/V of 3 exhibits a maximum temperature of 60° C. and with an S/V of 13.5 only 35° C. Also, it was investigated whether the achievable material temperature $T_{max}$ depends on the mass of the test specimens used. No dependence was found in the investigated mass range of from 45 to 320 mg. Sample masses of 50 mg and 250 mg showed approximately the same values for $T_{max}$ at approximately constant S/V.

A method for producing a programmed body is illustrated with reference to the FIGS. 5A and 5B, using the example of article 10 from FIG. 2. As shown in FIG. 5A, the article 10 is initially provided in its permanent shape, PS. If the shape memory polymer 14 used is a polymer network, the permanent shape PS is formed as early as during polymerization of the monomers or macromonomers, and the permanent shape PS is fixed by the generated crosslinking sites. In the event of thermoplastics polymerized prior to shaping thereof, the permanent shape PS is produced by solidification of the polymer melt in suitable molds, for instance in an injection molding process. In both cases it is possible to change the permanent shape afterwards by means of mechanical (material-removing) or thermomechanical processing.

As illustrated in FIGS. 5 A and B, subsequent programming of the article 10 may proceed in such a way that the article 10 is initially heated to a temperature above the switching temperature and deformed at this temperature, followed by cooling below the switching temperature, thereby exerting a shaping force on the article 10. As a result, the first temporary shape, TS1, is fixed. In the illustrated example, deformation of the two sections 18, 20 proceeds simultaneously at elevated temperature. Alternatively, each of the two sections 18, 20 can be separately heated, deformed and subsequently fixed. In this event, the section 20 having the higher S/V is initially deformed above the switching temperature, followed by cooling so that the second temporary shape, TS2, is fixed. Thereafter, the section 18 having the lower S/V is deformed above the switching temperature, followed by cooling so that the first temporary shape, TS1, is fixed. Care should be taken in programming so that programming of one section would not remove the programming of another section. In particular, the S/V of one section of the article should not pass through the S/V of another section during recovery into the permanent shape.

As an alternative to the thermomechanical programming illustrated above, programming may also be performed by cold stretching, or, with materials whose switching is based on a glass transition, by temporary incorporation of plasticizers, in such a way that the switching temperature drops below ambient temperature. It is also possible to use different programming methods for the different sections 18, 20.

The retrieval of stored shapes of a programmed article is illustrated in FIG. 5, B through D. Starting from the first temporary shape TS1, in which both partial sections 18 and 20 are present fixed in their deformed shapes (FIG. 5B), the article 10 is exposed to a first magnetic field $M_1$, the magnetic field strength and/or frequency of which is suitable to heat the section 18 having the lower S/V to a temperature above the switching temperature of the shape memory polymer. This causes shape recovery of the section 18 into its original shape, and the article 10 is transformed from its first temporary shape TS1 into its second temporary shape TS2 (FIG. 5C). The second temporary shape TS2 remains stable as long as the article 10 is not exposed to a stronger magnetic field or an ambient temperature above the switching temperature. To additionally restore the permanent shape PS, the article 10 present in its second temporary shape TS2 is exposed to a second magnetic field $M_2$, the magnetic field strength and/or frequency of which is suitable to additionally heat the section 20 having the higher S/V to or above the switching temperature. This causes recovery of the section 20 into its original shape, and the article 10 is transformed from its second temporary shape TS2 into the permanent shape PS (FIG. 5D). Although the section 18 is correspondingly heated during this step, no change in shape takes place in this case because this section is already present in its permanent shape. Consequently, the overall geometry of article 10 must be selected in such a way that, even during switching the last change in shape, i.e. the section with the highest S/V, the elevated temperatures in the first-switched sections with lower S/V would not be detrimental to the application and the required stability of the whole component is retained.

Magnetically Inducible Multi-Shape Effect of a Composite Made of a PCL Polymer Network and Magnetic Nanoparticles A composite material of thermally crosslinked PCL dimethacrylate (10 kD) and 5 wt. % nanoparticles (AdNano® MagSilica 50, Degussa Advanced Nanomaterials) was prepared. Using this material, a test specimen in the form of a flat body (permanent shape) was produced by casting in a Teflon mold. The test specimen essentially corresponded to the one illustrated in FIG. 2 and comprised two blocks (sections 18, 20) of different geometry, and the first section 18 had an S/V of 0.8 $m^{-1}$ and the second had an S/V of 2.8 $m^{-1}$. The two sections 18, 20 were connected to each other via a bridge 1 mm in height and functioning as insulating section 22. Programming the first temporary shape TS1 was performed by rectangular bending of the sample ends at 80° C. and subsequent cooling as represented in FIG. 5B. Recovery was subsequently effected in a magnetic field at a field strength of 14 kA/m and 254 kHz in air at an ambient temperature of 25° C. This involved initial recovery of section 18 having the lower S/V of 0.8 $m^{-1}$ (in accordance with FIG. 5C). Recovery from TS1 to TS2 required reaching the switching temperature in the square section 18 and took several minutes. The other section 20 remained unchanged during this process. Thereafter, the magnetic field strength was increased to 19.3 kA/m, effecting similar recovery of section 20 having the higher S/V. Again, a flat body corresponding to the permanent shape PS (FIG. 5D) was obtained.

Quantification of the S/V Influence on Recovery in a Magnetic Field

To investigate the dependence of the magnetically induced shape memory effect on the geometry, especially the surface-to-volume ratio, the sections of a thus-prepared test specimen were deformed on both sides to an angle of 90° at an ambient temperature of 80° C. and fixed by cooling to 25° C. (programming). The test specimen, accordingly being in its temporary shape, was placed in a high-frequency magnetic field coil. The magnetic field strength was subsequently increased by 0.2 kA/m at intervals of 40 seconds. Recovery was recorded on a videotape. The recovery angle versus time was subsequently evaluated on the monitor. The recovery angles for test specimen sections with different S/V are plotted versus the magnetic field strength in FIG. 6. As is clearly seen, the section having the lower S/V (square symbols) has already undergone recovery, while the section having the higher S/V (circular symbols) still has its temporary shape. Only after further increasing the magnetic field strength, this section returns to its original shape.

Quantification of the S/V Influence on Recovery in a Magnetic Field Using the Example of a PPDL-PCL Molding To investigate the dependence of the magnetically induced shape memory effect on the geometry, especially the surface-to-volume ratio, test specimens were prepared from a composite material consisting of a copolymer of polypentadecalactone (PPDL) and poly(ε-caprolactone) (PCL) and 10 wt. % nanoparticles (AdNano® MagSilica 50, Degussa Advanced Nanomaterials, AdNano® MagSilica 50, Degussa Advanced Nanomaterials, 50 to 60 wt. % iron(III) oxide in an $SiO_2$ matrix). The standard test specimens (IBB according to EN ISO 527-2) were produced in an injection molding process and had a material thickness of 1 mm and 2 mm and consequently an S/V of 3.1 and 2.1, respectively. The corresponding test specimens 24 and 26 in their permanent shape are shown on the left in FIG. 7. The test specimens were deformed to an acute angle of about 110° at an ambient temperature of 60° C. and fixed by cooling (programming). The test specimens 24' and 26', accordingly being in their temporary shape, are shown on the right in FIG. 7. Thereafter, the shape memory effect in the two programmed samples 24' and 26' was initiated in a high-frequency magnetic field, during which process the samples were fixed on a sample holder in the induction center of the magnetic field. The recovery angle was measured after magnetic field exposure for five minutes each time. Full recovery corresponds to a recovery angle of 0°. The magnetic field strength was increased step by step, and the recovery was determined each time. The results are shown in FIG. 8. It was found that recovery was almost absent at relatively high S/V (test specimen 24, 1 mm) at low magnetic field strengths and very low at higher magnetic field strengths. This implies that, even at the highest investigated magnetic field strength, the material temperature required for recovery was not achieved for test specimen 24 with high S/V. In contrast, recovery to an angle of about 20° was achieved with lower S/V (test specimen 26, 2 mm) from a magnetic field strength of about 15 kA/m on. Similarly, a thermally induced recovery at 60° C. performed for comparison failed to exhibit complete recovery.

REFERENCE NUMBERS AND ABBREVIATIONS

10 Article
12 Shape memory composite material
14 Shape memory polymer
16 Magnetic material
18 First section
20 Second section
22 Insulating section
24 Test specimen, permanent shape
24' Test specimen, temporary shape
26 Test specimen, permanent shape
26' Test specimen, temporary shape
PS Permanent shape
TS1 First temporary shape
TS2 Second temporary shape
S/V Surface-to-volume ratio

The invention claimed is:

1. An article (10) made of an uniform shape memory composite material (12) comprising a shape memory polymer (14) and a magnetic material (16) embedded therein, said shape memory polymer (14) after thermomechanical programming being capable of undergoing at least one temperature-induced shape transition from a temporary shape into a permanent shape, characterized in that the article (10) has at least two directly or indirectly interconnected sections (18, 20) differing from each other in their surface/volume ratio (S/V)), the surface-to-volume ratios (S/V) of the at least two sections (18, 20) being selected in such a way that the sections (18, 20) exhibit a difference of the maximum material temperature ($T_{max}$) achievable in a given magnetic field of at least 10 K.

2. The article (10) according to claim 1, characterized in that the transition between the surface-to-volume ratios (S/V) of the at least two sections (18, 20) at their boundary surface is abrupt or, in relation to the overall expanse of the article (10), steep.

3. The article (10) according to claim 1, characterized in that the surface-to-volume ratios (S/V) of the at least two sections (18, 20) differ by a factor of at least 1.2.

4. The article (10) according to claim 1, characterized in that the surface-to-volume ratios (S/V) of the at least two sections (18, 20) are selected in such a way that sections (18, 20) exhibit a difference of the maximum material temperature ($T_{max}$) achievable in the given magnetic field.

5. The article (10) according to claim 1, characterized in that the magnetic material (16) is in the form of particles.

6. The article (10) according to claim 1, characterized in that the magnetic material (16) is at least one component selected from the group comprising metals, alloys, metal oxides, and ferrites.

7. The article (10) according to claim 1, characterized in that the particles of the magnetic material (16) have a coating of material that improves the miscibility with the shape memory polymer (14).

8. The article (10) according to claim 1 characterized in that the shape memory polymer (14) comprises a physically or covalently crosslinked polymer network which has at least one switching segment selected from the group of polyesters, polyethers, polyurethanes, polyether urethanes, polyamides, polyimides, polyether imides, polyacrylates, polymethacrylates, polyvinyls, polystyrenes, polyoxymethylenes, and poly(para-dioxanone).

9. The article (10) according claim 1, characterized in that the shape memory polymer (14) contains hydrolytically cleavable groups.

10. The article (10) according to claim 1 characterized in that the magnetic substance (16) is homogeneously distributed in the shape memory polymer (14).

11. The article (10) according to claim 1, characterized in that each of the at least two sections (18, 20) has a constant material thickness in at least one direction in space and/or a constant surface/volume ratio (S/V) in at least a direction in space.

12. The article (11) according to claim 3, wherein the direction in space is along the longitudinal expanse of the sections (18, 20).

13. The article (10) according to claim 1, characterized in that the at least two sections (18, 20) are connected to each other via a thermally insulating section (22).

14. The article (13) according to claim 6, wherein the thermally insulating section (22) has a surface-to-volume ratio (S/V) corresponding to at least that of the section (18, 20) having the higher surface-to-volume ratio (SAT).

15. A method for producing a programmed article (10), said method including the steps of: a) providing an article (10) according to claim 1 in a permanent shape; b) deforming a first section (18) of the article (10) at a material temperature above the switching temperature of the shape memory composite material (12) and subsequently cooling below the switching temperature; and c) deforming a second section (20) of the article (10) at a material temperature above the switching temperature of the shape memory composite material (12) and subsequently cooling below the switching temperature; wherein the steps b) and c) can be performed in any order or simultaneously.

16. A method for retrieving stored shapes of a programmed article (10) according to claim 1, said method including the steps of: (a) exposing the article (10) to a first alternating magnetic field which is suitable to heat a first section (18) of the article (10) with a first surface-to-volume ratio $(S/V_1)$ above the switching temperature of the shape memory composite material (12), said first section (18) undergoing a shape transition and said article (10) being transformed from a first temporary shape (TS1) into a second temporary shape (TS2); and (b) exposing the article (10) to a second alternating magnetic field which is suitable to heat a second section (20) of the article (10) with a second surface-to-volume ratio $(S/V_2)$ greater than the first surface-to-volume ratio $(S/V_1)$ of the first section (18) above the switching temperature of the shape memory composite material (12), said section (20) undergoing a shape transition and said article (10) being transformed from the second temporary shape (TS2) into the permanent shape (PS).

17. The method according to claim 16, characterized in that the transition from the first alternating magnetic field to the second alternating magnetic field is effected by a step-by-step or continuous increase of the magnetic field strength and/or frequency.

18. An article (10) made of an uniform shape memory composite material (12) comprising a shape memory polymer (14) and a magnetic material (16) embedded therein, said shape memory polymer (14) after thermomechanical programming being capable of undergoing at least one temperature-induced shape transition from a temporary shape into a permanent shape, wherein the article (10) has at least two directly or indirectly interconnected sections (18, 20) differing from each other in their surface/volume ratio (S/V) by a factor of at least 2.0.

* * * * *